US006051892A

United States Patent [19]

Toal, Sr.

[11] Patent Number: 6,051,892

[45] Date of Patent: Apr. 18, 2000

[54] HYDROELECTRIC POWER SYSTEM

[76] Inventor: Timothy Michael Toal, Sr., 2936 Noonan St., Honolulu, Hi. 96818

[21] Appl. No.: 09/114,623

[22] Filed: Jul. 13, 1998

[51] Int. Cl.[7] .............................. F03B 17/02; H02N 6/00; H02P 9/04

[52] U.S. Cl. .............................................. 290/43; 290/54

[58] Field of Search .......................... 290/43, 54; 60/370

[56] References Cited

U.S. PATENT DOCUMENTS

| | | | |
|---|---|---|---|
| 4,258,269 | 3/1981 | Tsubota | 290/53 |
| 4,307,299 | 12/1981 | Norton | 290/52 |
| 4,345,160 | 8/1982 | Smith | 290/52 |
| 4,408,452 | 10/1983 | Tsunoda | 60/398 |
| 4,443,707 | 4/1984 | Scieri | 290/4 R |
| 4,445,046 | 4/1984 | Allegre et al. | 290/52 |
| 4,514,977 | 5/1985 | Bowen | 60/398 |
| 4,629,904 | 12/1986 | Rojo et al. | 290/52 |
| 4,739,620 | 4/1988 | Pierce | 60/641.8 |
| 4,816,696 | 3/1989 | Sakayori et al. | 290/52 |
| 5,281,856 | 1/1994 | Kenderi | 290/54 |
| 5,337,560 | 8/1994 | Abdelmalek | 60/370 |
| 5,584,179 | 12/1996 | Isa | 60/370 |

*Primary Examiner*—Nicholas Ponomarenko
*Attorney, Agent, or Firm*—Michael I. Kroll

[57] ABSTRACT

A micro hydroelectric power conversion system for supplying power to and driving an electrical system. The system includes first and second storage tanks each including a base side and a top side and positioned in a stacked relationship with each other such that the top side of the second storage tank faces the base side of the first storage tank. A pipeline connects the base of the first storage tank to the top side of the second storage tank and a penstock including a wheel and an electrical generator connected to the wheel is connected to the pipeline. A rechargeable power supply is connected to receive power from the electrical generator for storing the received power and selectively supplying the received power to the electrical system being driven. A return pipe is connected between the base side of the second storage tank and the top side of the first storage tank and a fluid is positioned within the system. A pump driven by an alternative power source is connected to the return pipe, wherein the first and second storage tanks, pipeline and feedback pipe form a sealed chamber with the fluid contained therein. When the pump is activated the fluid is caused to continually flow from the second storage tank through the return pipe into the first storage tank and through the pipeline back into the second storage tank whereby, as the fluid passes through the pipeline, the wheel is caused to turn driving the electrical generator to supply electrical energy to recharge the rechargeable power source.

3 Claims, 5 Drawing Sheets

HYDROELECTRIC POWER SYSTEM

BACKGROUND OF THE INVENTION

1. Field of the Invention

The present invention relates generally to electrical energy conversion devices and, more specifically, to an hydroelectric electrical energy conversion device including a stacked series of water tanks each acting as head water to an adjacent tank located therebelow and connected by penstocks, the tank located subsequently along the flow path acting as a basin wherein the last tank in the series is connected via a pump to return the water back to the first tank thereby forming a closed pressurized hydroelectric power system, electrical generators positioned between each tank are powered by the flowing water to charge power sources connected thereto. The power sources providing power to the pump as well as other electrical systems connected thereto.

2. Description of the Prior Art

Numerous types of energy conversion devices have been provided in the prior art. For example, U.S. Pat. Nos. 4,307,299; 4,345,160; 4,408,452; 4,443,707; 4,445,046; 4,514,977; 4,629,904 and 4,816,696 all are illustrative of such prior art. While these units may be suitable for the particular purpose to which they address, they would not be as suitable for the purposes of the present invention as heretofore described.

A system for generating electrical energy which combines water power and combustible fuel in a manner to utilize, according to varying conditions, the best combination of energy sources for maximum economy of electrical generation, including an elevated body of water having connection to a hydraulic generating means positioned at a lower elevation, the water flowing from the body of water to the hydroelectric generating means through a penstock, a fuel powered gas turbine generator adapted to use combustible fuel and compressed air as a means of generating electricity, an hydraulic air compressor means adjacent to the body of water, a penstock having a water inlet connected to the body of water and having a water outlet, the hydraulic head of which is below the water inlet, and an air outlet connected to the gas turbine generator and means to selectably divert the water flow to the hydroelectric generator and/or the hydraulic air compressor so that electricity may be generated selectably utilizing the energy source of water power and combustible fuel according to parameters of availability and economics.

An electrical power generation system includes a waterwheel contained within a housing enclosure above a water collection compartment, a water discharge nozzle in alignment with said waterwheel, means for delivering water to said discharge nozzle including a pump for returning water from the collection compartment, a portion of the output of the waterwheel being used to drive the pump, wherein the waterwheel includes fin elements having inclined water entrapping flange portions and is supported by means of an adjustable support to maintain the waterwheel dynamically balanced and in alignment with the discharge nozzle.

In a pumping-up hydroelectric power plant comprising a single speed main pump/turbine and a booster pump operable in series in a pumping operation between an upper reservoir and a lower reservoir, a water head shared by said booster pump is varied depending on a variation in the static head between the two reservoirs for maintaining the operation of the main pump/turbine always in a maximum efficiency range.

A hydro electric generating system to produce power by changing the potential energy of water to kinetic energy to drive a turbine that is coaxially connected to a generator. Water from the ambient enters the reservoir and is directed by a valve to a conduit to the turbine which turns a generator to produce electricity. The system is constructed in such a manner that it may supply power during peak- power demand and be used as a storage system during low power demand.

The front portion of the immersed turbo-generator bulb houses the alternator. The intermediate portion houses the gear box, and the rear portion has the turbine projecting therefrom. The intermediate portion is of greater diameter than the front portion and they are interconnected by a flange. The external cooling is by tubes through which cooling air flows, and having one end connected to orifices through the flange.

A vacuum pump attached to the top of an enclosed tank situated above a lower liquid level is utilized sequentially to draw liquid from the lower level into the tank and thereafter drain the tank to a useful purpose including a low head turbine generator, irrigation, storage and other useful purposes.

A small-scale hydroelectric generator has a micro-hydro axial-flow turbine mounted in a lower end of a penstock, preferably of the siphon type, through which water is diverted from an intake basin. The turbine comprises a stator section formed with an axial core providing an annular passageway having an outlet end in close proximity to a rotor of a coaxial adjacent rotor section. The blades of the rotor have a length equal to the internal radius of the passageway. A plurality of flaps are arranged in an expandable circle between the stator section and rotor. A float mechanism located in the intake basin follows the water level and controls the extended positions of the flaps reducing the water flow through the penstock in a predetermined relation to the water level. The annular passageway has fixed vanes directing the stream of water in a helical swirling motion of predetermined pitch to impinge upon the blades which are disposed to receive the stream at an optimum angle of 90°. The generator is located remote from the turbine with a closed hydraulic system comprising a variable displacement pump located at and driven by the turbine and a hydraulic motor located at and driving the generator. The pump has a flow control driving the motor at a constant RPM at all acceptable load conditions placed on the generator. A variable-speed pumped-storage power generating system includes a variable-speed generator/motor, a frequency converter connected to an electric power system, and a pump/turbine driven by the generator/motor. The power generating system comprises an optimum rotation speed function generator calculating an optimum rotation speed of the motor for driving the pump, a speed detector generating a speed detection signal of the motor, a speed regulator receiving the output signals from the function generator and speed detector for generating an output correction signal, an adder adding the output correction signal to output command signal, a comparator comparing the output signal of the adder with an output power detection signal generated from a motor output detector and generating an error signal, and an output regulator controlling the excitation of the secondary winding of the motor through the frequency converter so as to decrease the output power error to zero, thereby controlling the output and rotation speed of the motor. The power generating system also comprises an optimum guide-vane opening function generator calculating an optimum guide-vane opening, a comparator comparing the output signal of the guide-vane opening function generator with a guide-vane opening detection signal from a guide-vane opening detector, and a guide-vane opening regulator controlling the opening of the guide-vanes according to the result of the comparison.

SUMMARY OF THE PRESENT INVENTION

The present invention relates generally to electrical energy conversion devices and, more specifically, to an electrical energy conversion device including a stacked series of water tanks each acting as head water to an adjacent tank located therebelow and connected by penstocks, the tank located subsequently along the flow path acting as a basin wherein the last tank in the series is connected via a pump to return the water back to the first tank thereby forming a closed pressurized hydroelectric power system, electrical generators positioned between each tank are powered by the flowing water to charge power sources connected thereto. The power sources providing power to electrical systems connected thereto.

A primary object of the present invention is to provide a micro hydroelectric power system that will overcome the shortcomings of prior art devices.

A further object of the present invention is to provide a micro hydroelectric power system which is portable.

A yet further object of the present invention is to provide a micro hydroelectric power system able to operate as a standalone power generator.

A still further object of the present invention is to provide a micro hydroelectric power system of a size small enough to be accommodated within a home or building utility room.

A further object of the present invention is to provide a micro hydroelectric power system able to store converted energy for use as needed.

An even further object of the present invention is to provide a micro hydroelectric power system capable of converting enough hydroelectric power to electrical power to operate energy dependent systems such as homes, office buildings and small industrial plants.

Another object of the present invention is to provide a micro hydroelectric power system able to increase the electrical output of the system by providing additional tanks and in line generators.

A still further object of the present invention is to provide a micro hydroelectric power system which is a sealed system utilizing vacuum power inherently generated in such a system for aiding in the return of the fluid back to the original tank.

A yet further object of the present invention is to provide a micro hydroelectric power system which incorporates alternate additional energy sources for powering the pump.

An even further object of the present invention is to provide a micro hydroelectric power system able to provide electrical power which does not pollute the environment thereby reducing the need for commercially supplied power such as from a nuclear power plant and the burning of fossil fuels.

Another object of the present invention is to provide a micro hydroelectric power system that is simple and easy to use.

A still further object of the present invention is to provide a micro hydroelectric power system that is economical in cost to manufacture.

Additional objects of the present invention will appear as the description proceeds.

A micro hydroelectric power conversion system for supplying power to and driving an electrical system is disclosed by the present invention. The system includes first and second storage tanks each including a base side and a top side and positioned in a stacked relationship with each other such that the top side of the second storage tank faces the base side of the first storage tank. A pipeline connects the base of the first storage tank to the top side of the second storage tank and a penstock including a wheel and an electrical generator connected to the wheel is connected to the pipeline. A rechargeable power supply is connected to receive power from the electrical generator for storing the received power and selectively supplying the received power to the electrical system being driven. A return pipe is connected between the base side of the second storage tank and the top side of the first storage tank and a fluid is positioned within the system. A pump is connected to the return pipe, wherein the first and second storage tanks, pipeline and feedback pipe form a sealed chamber with the fluid contained therein. When the pump driven by an alternative power source is activated the fluid is caused to continually flow from the second storage tank through the return pipe into the first storage tank and through the pipeline back into the second storage tank whereby, as the fluid passes through the pipeline, the wheel is caused to turn driving the electrical generator to supply electrical energy to recharge the rechargeable power source.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
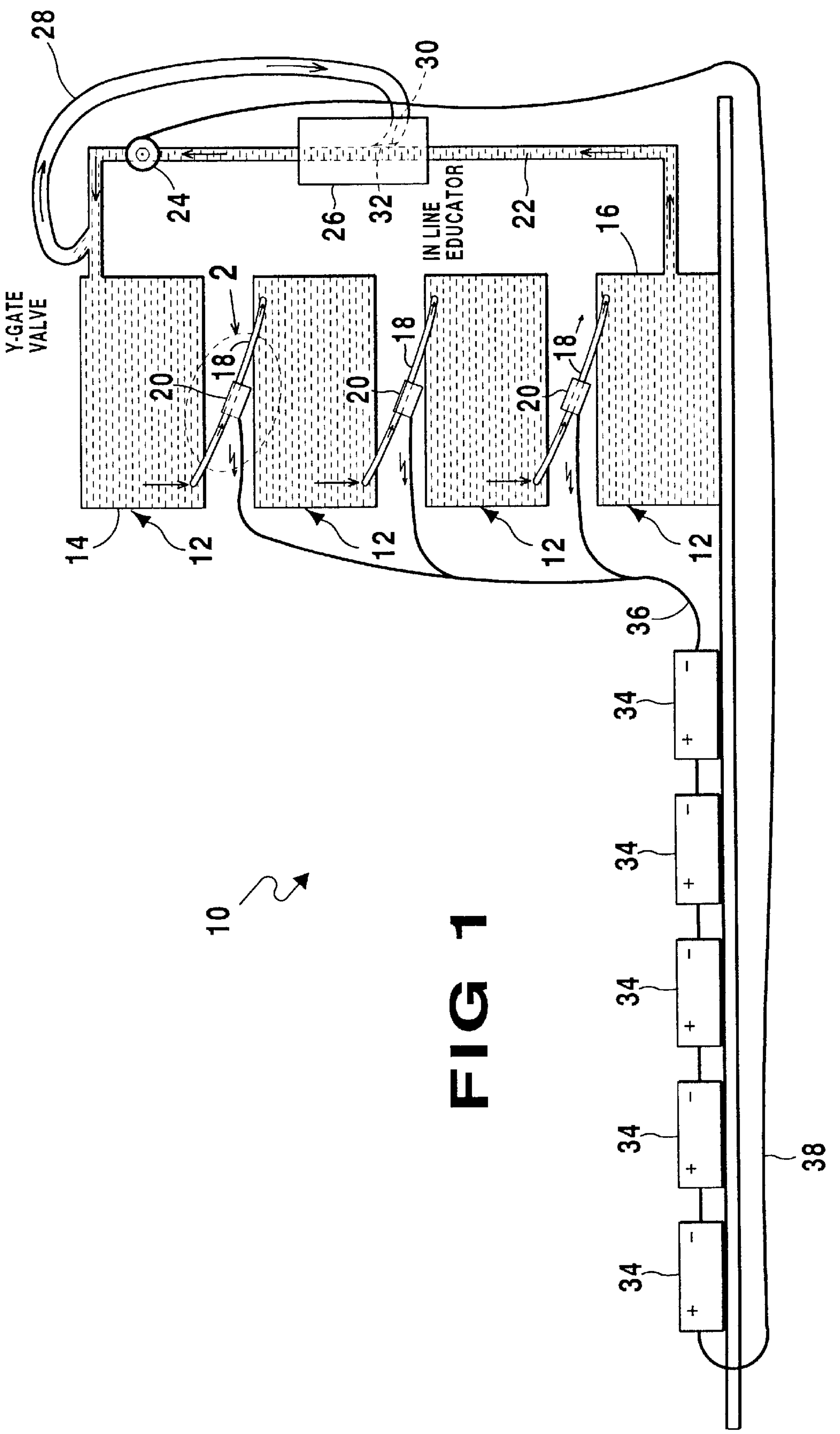
FIG. 1 is a side diagrammatic view of the micro hydroelectric power system of the present invention.

Turning now descriptively to the drawings, in which similar reference characters denote similar elements throughout the several views, the Figures illustrate the micro hydroelectric power system of the present invention. With regard to the reference numerals used, the following numbering is used throughout the various drawing figures.

10 micro hydroelectric power system of the present invention
12 plurality of tanks
14 top tank
16 bottom tank
18 tube connecting adjacent tanks
20 penstock positioned in flow path between adjacent tanks
22 pipe line connecting bottom and top tanks
24 pump
26 in line educator
28 fluid feedback pipe
30 valve within fluid feedback pipe
32 connection point between feedback pipe and in line educator
34 power sources charged by electrical energy converted by penstocks
36 power line connecting penstocks to power sources
38 power line between power sources and pump
40 fluid in pipe
42 arrows indication direction of flow of fluid
44 waterwheel
46 electric generator
48 electrical system powered by power source
50 connection line between power source and electrical system
52 connection line between generator and electrical system
56 return flow path
58 alternate power source
60 sun
62 connection line between alternate power source and pump

DETAILED DESCRIPTION OF THE PREFERRED EMBODIMENT

Turning now descriptively to the drawings, in which similar reference characters denote similar elements throughout the several views, FIGS. 1 through 5 illustrate the micro hydroelectric power system indicated generally by the numeral 10.

The micro hydroelectric power system 10 is illustrated in FIG. 1 and includes a plurality of serially connected tanks 12. The plurality of tanks 12 are positioned in a stacked relationship with each other. A top tank 14 receives the fluid flowing through the system 10 and a bottom tank 16 acts as a basin receiving the fluid which has flowed through the system 10. The fluid is then returned to the top tank 14 and recycled through the system 10. Each of the plurality of tanks 12 is connected with an adjacent tank on top and an adjacent tank below via a tube 18 and penstock 20 combination. The bottom tank 16 is connected to the top tank 14 for recycling the fluid in the system 10 via a pipe line 22.

A pump 24 is connected to the pipe line 22 for pumping the fluid contained within the bottom tank 16 through the pipe line 22 to the top tank 14. An in line educator 26 is also provided connected to the pipe line 22 for monitoring fluid pressure through the pipe line 22. A feedback pipe 28 is connected between a top portion of the pipe line 22 and the in line educator 26 for recycling fluid within the pipe line 22 when the in line educator 26 determines that the fluid pressure in the pipe line 22 is determined to be below a predetermined value. The in line educator 26 will control a valve 30 located at the connection point 32 of the feedback pipe 28 and the in line educator 26 to open upon determining the fluid pressure is below the predetermined value.

The penstocks 20 are all connected to supply electrical energy converted from the potential energy stored in the fluid flowing therethrough to a plurality of batteries 34 via a connection line 36. The batteries 34 are charged by the energy supplied by the penstocks 20 and store the supplied electrical energy for use at a later time or as needed. The batteries 34 are also connected via a connection line 38 to provide power for operation of the pump 24 causing fluid to flow through the system 10 and recharging the batteries as they provide the power to the pump 24. It is understood that in the embodiment illustrated in FIG. 1, that it would be necessary to provide an additional charging source (not shown) for batteries 34 when the latter run down.

Figure 2:
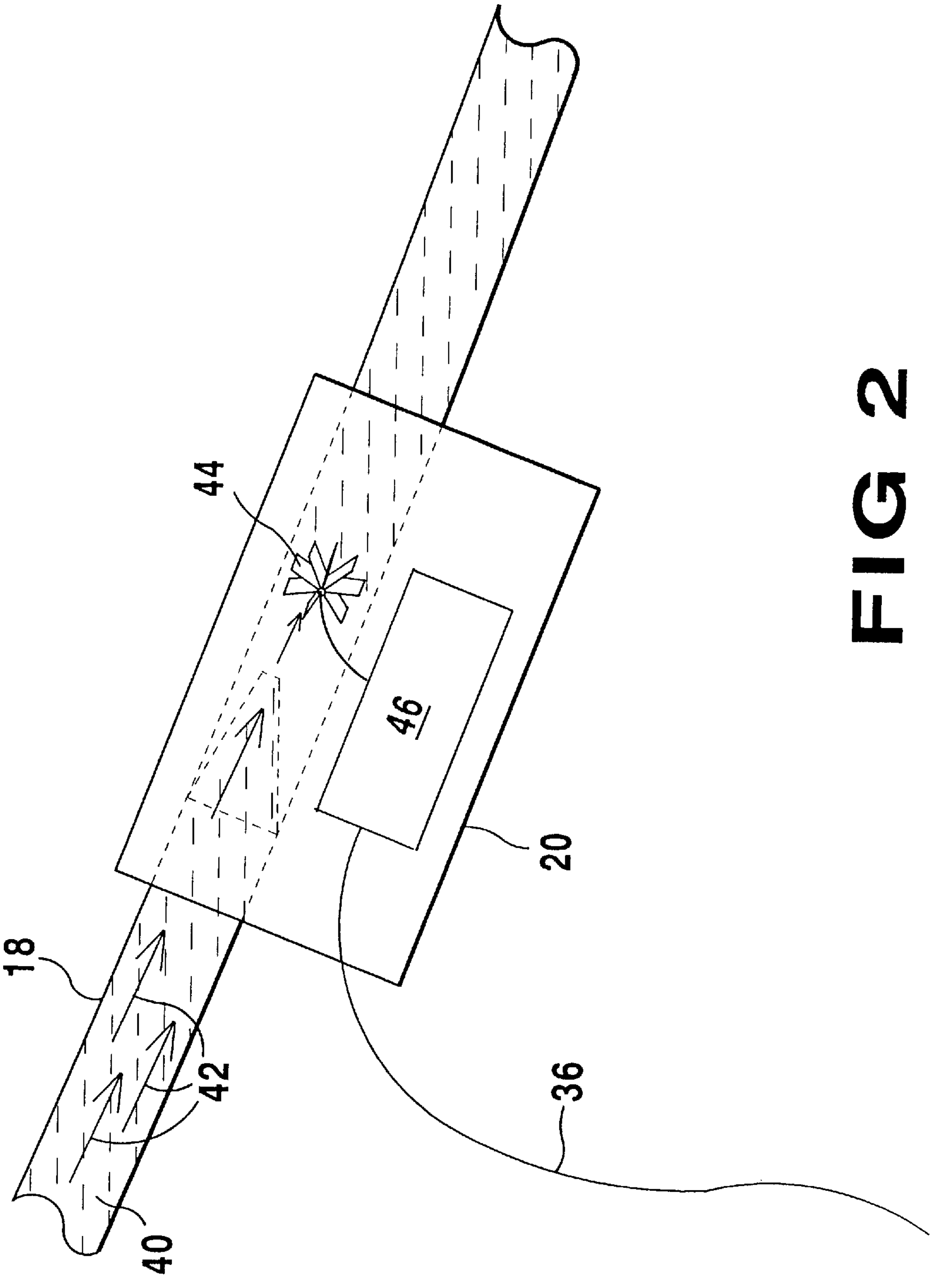
FIG. 2 is an exploded view of a penstock positioned between the tanks of the micro hydroelectric power system of the present invention and shown in the circle labeled 2 of FIG. 1.

An enlarged view of a penstock 20 connected to the tube 18 is illustrated in FIG. 2. From this figure, the direction of flow of the fluid 40 in the tube 18 is shown by the arrows labeled 42. The fluid 42 flows through the penstock 20 wherein it encounters a waterwheel 44. The fluid causes the waterwheel 44 to spin. The waterwheel 44 is connected to power an electric generator 46 when it is caused to spin. The electric generator 46 converts the potential energy stored in the flowing fluid into electrical energy which is applied through the connection line 36 to charge the power source 34. The fluid passes through the penstock 20 and into a tank 12 positioned therebelow along the path formed by the system 10. Between each pair of tanks 12 the flowing fluid encounters a penstock including a waterwheel 44 and electrical generator 46. The electrical generator 46 is powered by the waterwheel 44 to convert the energy of the flowing fluid into electrical energy for charging the power supply. When the fluid 40 reaches the bottom tank 16 it is returned to the top tank 14 and is recycled to flow back through the system.

Figure 3:
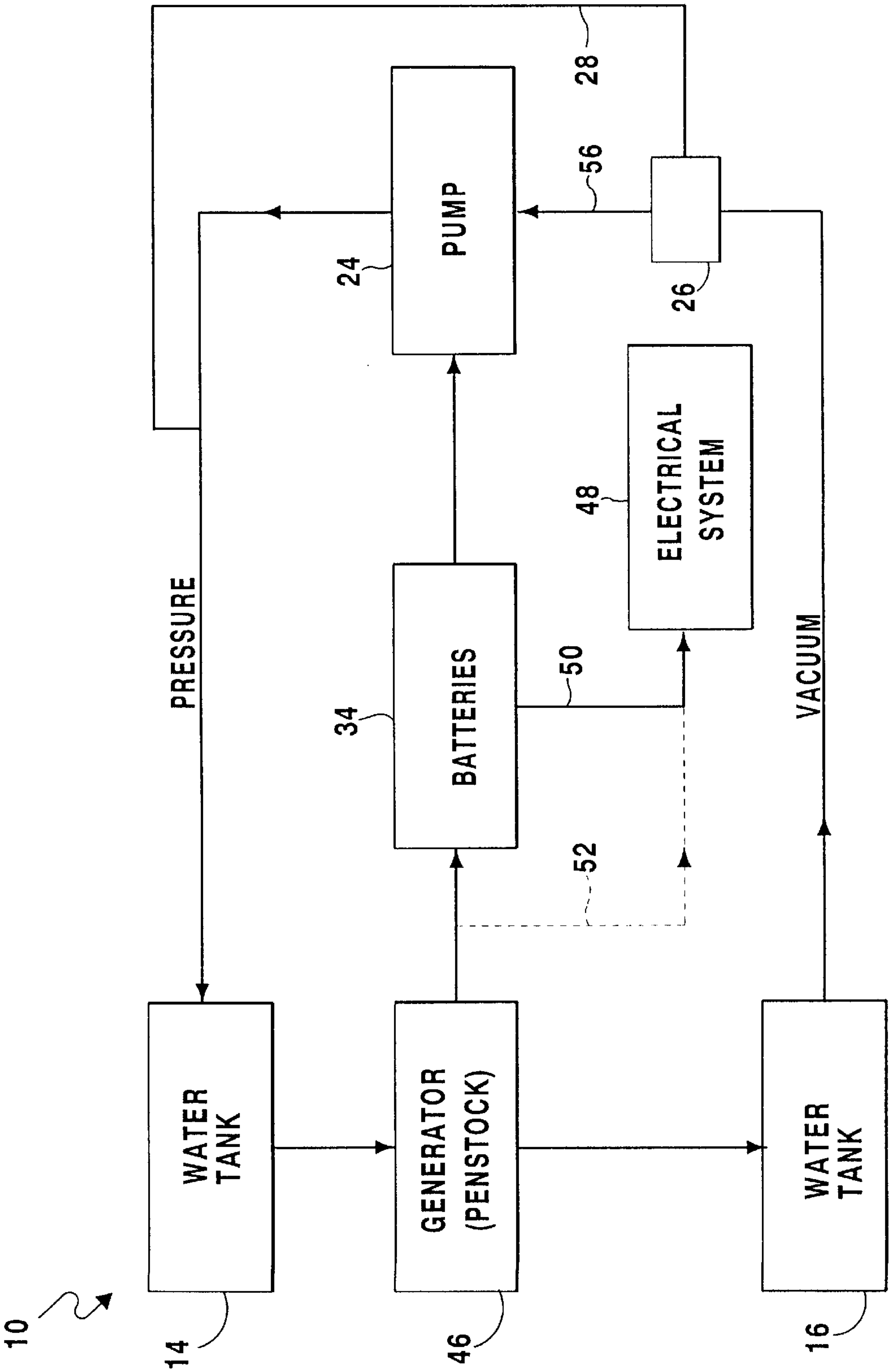
FIG. 3 is a block diagram illustrating the interrelationship between elements of the micro hydroelectric power system of the present invention.

A block diagram of the micro hydroelectric power system 10 including two tanks 12 is illustrated in FIG. 3. From this figure it is seen that the top tank 14 receives the fluid flowing through the system 10 and supplies it through a generator 46 to the bottom tank 16. The generator 46 is part of the penstock 20 illustrated in FIGS. 1 and 2 and is powered by a waterwheel 42 to convert the energy of the flowing fluid into electrical energy.

The generator is connected to the power supply 34 acting to supply an electrical charge to the power supply 34 to thereby recharge the power supply 34. The power supply is illustrated as a plurality of batteries. However, any rechargeable power supply may be connected to and recharged by the generator 44.

The power supply is connected to an electrical system 48 via a connection line 50, supplying power as needed to the system 48. The electrical system may be any type of electrically controlled system such as the lighting system of a house or building. Alternatively, the generator 44 may be directly connected to the electrical system 48 via an electrical connection line 52, illustrated in dashed lines in FIG. 3.

The power source 34 is connected to provide power to power the pump 24. The pump 24 is connected between the top tank 14 and the bottom tank 16 providing a flow path 56 for the fluid. The pump 24 aids the fluid in flowing from the bottom tank 16 back up to the top tank 14 so it may be recycled through the system 10. As this a closed, sealed system, the flow of fluid therethrough causes a vacuum to form therein. The vacuum effect aids the flow of fluid through the system thereby reducing the amount of work performed by the pump 24 and thus the energy consumption of the pump 24.

The feedback pipe 28 is connected to the flow path 56 on either side of the pump 24. This returns fluid exiting the pump 24 to return to the intake of the pump 24. The feedback pipe 28 is controlled to supply fluid to the intake of the pump 24 by the in line educator which measures the fluid pressure through the flow path 56. The feedback pipe 28 creates an eddy effect which also aids the pump 24 in recycling water through the system 10, increasing the fluid pressure in the flow path 56 as it supplies fluid to the pump intake.

Figure 4:
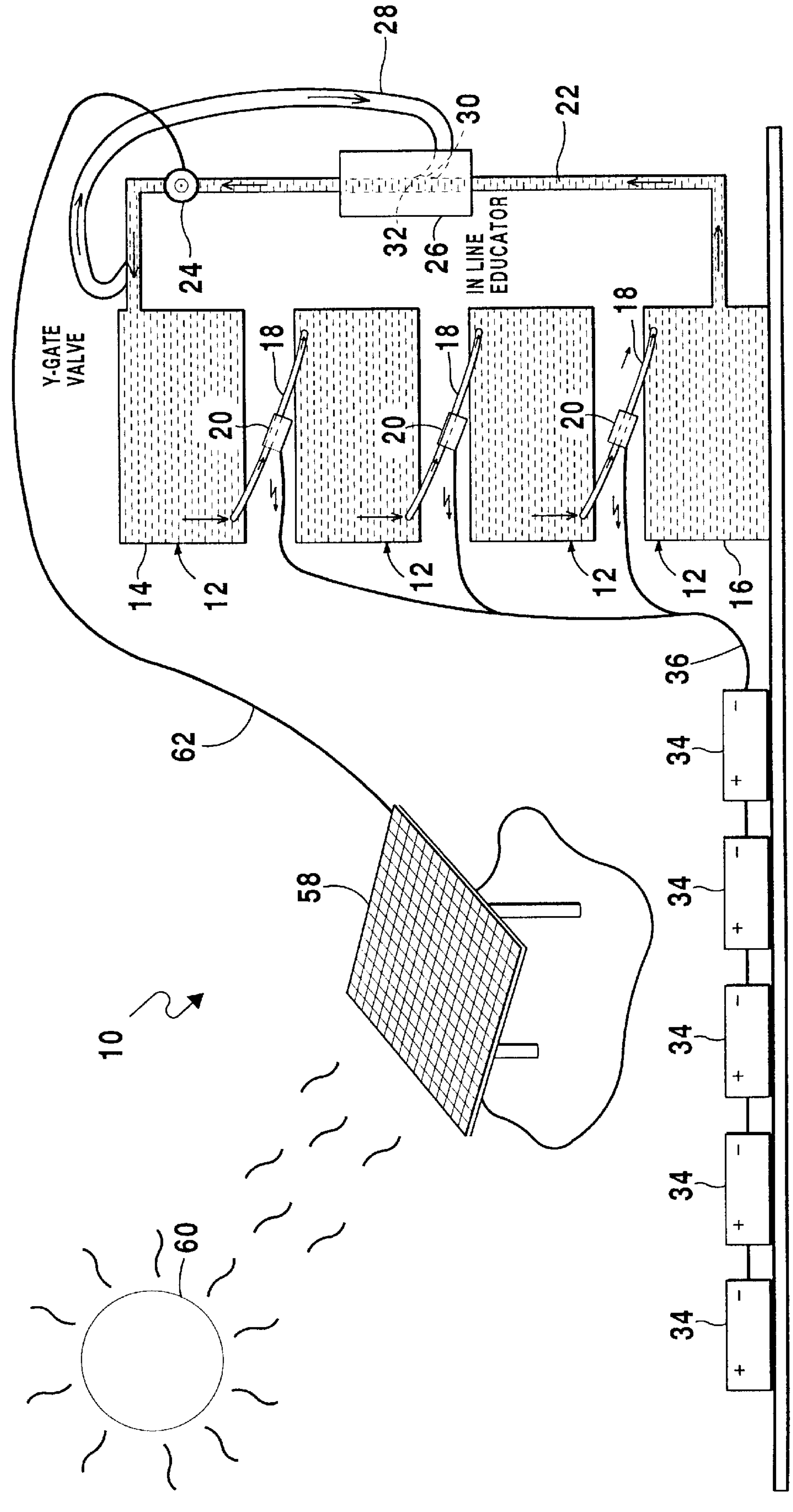
FIG. 4 is a side diagrammatic view of the micro hydroelectric power system of the present invention including[]an alternate power source for providing power to operate the pump.

FIG. 4 illustrates the micro hydroelectric power system 10 of the present invention including an alternate power source 58 for powering the pump 24. This figure illustrates use of a solar energy panel 58 able to convert solar energy received from the sun 60 and connected to the pump 24 via the connection line 62 for providing power the pump 24 and thus relieve a drain on the power source 34 caused by the power required to power the pump. The illustration of a solar energy panel is for purposes of illustration only. Alternatively, any type of alternate power source able to supply a sufficient amount of power to the pump 24 may be used.

While a preferred mechanism for providing power to the pump is shown and described herein, those of ordinary skill in the art who have read this description will appreciate that there are numerous other mechanisms for providing power to the pump and, therefore, as used herein the phrase "means for providing power to the pump" should be construed as including all such mechanisms as long as they achieve the desired result of providing power to the pump, and, therefore, that all such alternative mechanisms are to be considered as equivalent to the one described herein.

Figure 5:
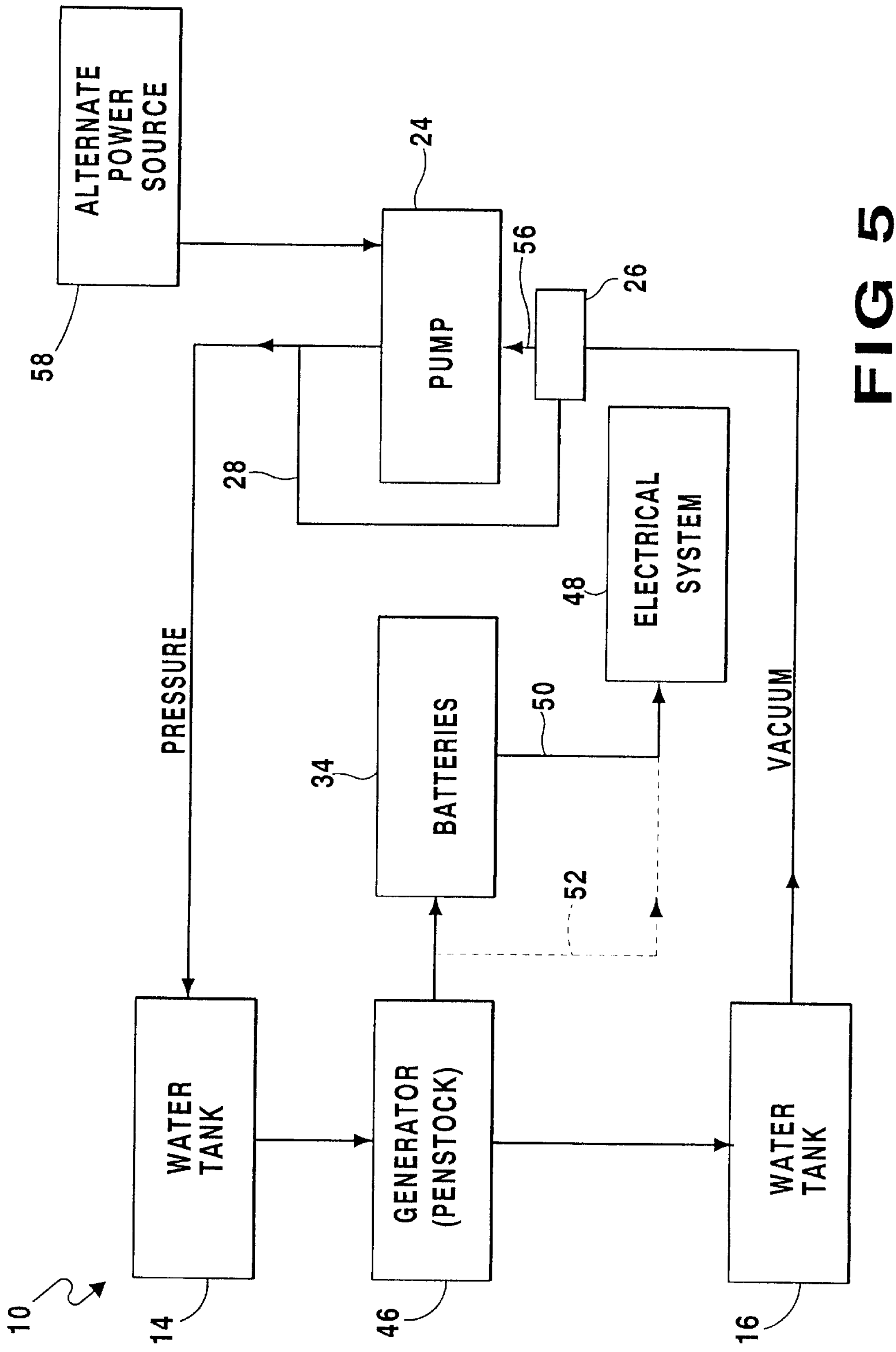
FIG. 5 is a block diagram illustrating the interrelationship between elements of the micro hydroelectric power system of the present invention including an alternate power supply for operating the pump.

A block diagram illustrating the micro hydroelectric power system 10 of the present invention including an alternate power source 58 for powering the pump 24 is shown in FIG. 5. This system 10 operates identically to the system illustrated in FIGS. 1–3 and includes an additional alternate power source for providing power to the pump 24. The use of the alternate power source 58 to provide power to the pump 24 acts to relieve strain on the power source 34 allowing the power source 34 to provide additional power to drive external electrical systems 48.

The operation of the micro hydroelectric power system 10 will now be described with reference to the figures. In operation, the micro hydroelectric power system 10 is self contained sealed system including a viscous fluid therein. The system 10 must be filled with a predetermined amount of fluid necessary for the system to operate. Between adjacent serially connected and stacked tanks 12 of the system are penstocks 20. The penstocks 20 must be connected to a power source which they will act to recharge when the system 10 is operating. If the rechargeable power source is being used to power the pump 24 for recycling the fluid through the system 10, then the power source 34 must be connected to the pump 24. If an alternate external power source 58 is being used to power the pump 24, then the alternate external power source 58 must be connected to the pump 24. The micro hydroelectric power system 10 of the present invention is now ready for operation.

The pump 24 is now turned on and it begins pumping fluid from the bottom tank 16 up to the top tank 14. When the fluid reaches the top tank 14 it is deposited therein and is caused to flow therethrough and into a pipe 18. Connected along the pipe 18 is a penstock 20 which receives the fluid and as the fluid passes therethrough it is caused to engage and turn a waterwheel 42. The waterwheel 42 is connected to an electric generator which is powered to convert the energy of the flowing fluid turning the waterwheel 42 into electrical energy. The electric generator 44 then provides the converted electrical energy to recharge the power supply 34. The fluid passes through the pipe 18 and into the next tank 12.

The fluid deposited in the next tank 12 flows therethrough and into another pipe 18. Connected along the pipe 18 is another penstock 20 which receives the fluid and as the fluid passes therethrough it is caused to engage and turn a waterwheel 42. The waterwheel 42 is connected to an electric generator which is powered to convert the energy of the flowing fluid turning the waterwheel 42 into electrical energy. The electric generator 44 then provides the converted electrical energy to recharge the power supply 34. The fluid passes through the pipe 18 and into the next tank 12. This continues until the fluid reaches the bottom tank 16.

When the fluid reaches the bottom tank 16, it is pumped by the pump 24 to flow through a return tube 22 back to the top tank 14 and repeat the process. As the fluid continues to recycle through the system 10 a vacuum pressure builds up within the system aiding the pump in recycling the fluid through the system 10. This added pressure reduces the amount of power needed to drive the pump 24 and thus, if the power source 34 is used to power the pump 24, the amount of power drained by operating the pump is reduced and the amount of charge stored by the power source 34 increases.

An in line educator 26 is provided on the return pipe 22 for measuring the amount of fluid pressure in the return pipe 22. The in line educator 26 is connected to a feedback pipe 28 which provides fluid at the output of the pump 24 back to the input of the pump 24 thereby increasing the fluid pressure in the return pipe 22. When the pressure measured by the in line educator 26 is below a predetermined amount, the in line educator 26 causes a valve 30 to open and provide the fluid in the feedback pipe 28 to the return pipe 22. The opening of the valve 30 also provides an additional feedback pressure in the line aiding the pump 24 in recycling the fluid through the system 10. This added pressure reduces the amount of power needed to drive the pump 24 and thus, if the power source 34 is used to power the pump 24, the amount of power drained by operating the pump is reduced and the amount of charge stored by the power source 34 increases. This continues for as long as it is desired to recharge the power source 34 or whenever it is desired to use an electrical system 48 powered by the micro hydroelectric power system 10 of the present invention.

The fluid used in the micro hydroelectric power system 10 may be any viscous fluid able to flow through the system 10. The only limitations on the fluid being its viscosity as a nonviscous or low viscous fluid will cause the pump to consume a large amount of energy and thus reduce the advantages of the system, e.g. the amount of energy converted by the penstocks, the recharging time of the power source, the amount of power needed to operate the pump.

Furthermore, the number of tanks used and the size of the tanks is dependent on the amount of energy needed to recharge the power source. For recharging a large power source. The system will include more tanks and thus be larger than if a small capacity power source is being recharged or a low power electrical system is being driven.

From the above description it can be seen that the micro hydroelectric power system of the present invention is able to overcome the shortcomings of prior art devices by providing a micro hydroelectric power system which is simple to operate, portable and able to operate as a stand alone power generator. The micro hydroelectric power system of a size small enough to be accommodated within a home or building utility room and can store converted energy for use as needed. The micro hydroelectric power system is capable of converting enough hydroelectric power to electrical power to operate with an alternative power source both the pump for returning the water back to the top tank and other energy dependent systems such as homes, office buildings and small industrial plants and will increase the electrical output of the system by providing additional tanks and in line generators. The micro hydroelectric power system which is a sealed system utilizing vacuum power inherent in such a system for aiding in the return of the fluid back to the original tank and can further increase the electrical output of the system by incorporating alternate additional energy sources for powering the pump while providing energy which does not pollute the environment thereby reducing the need for commercially supplied power such as from a nuclear power plant and the burning of fossil fuels. Furthermore, the micro hydroelectric power system of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A micro hydroelectric power conversion system comprising:

a) a first storage tank including a base side and a top side;

b) a second storage tank including a top side and a base side, said first and second storage tanks positioned in a stacked relationship with each other such that said top side of said second storage tank faces said base side of said first storage tank;

c) a fluid;

d) a pipeline connecting said base of said first storage tank to said top side of said second storage tank;

e) a penstock including a wheel and an electrical generator connected to said wheel, said penstock being connected to said pipeline;

f) a rechargeable power supply connected to receive power from said electrical generator for storing the received power and selectively supplying the received power to the electrical system being driven;

g) a return pipe connected between said base side of said second storage tank and said top side of said first storage tank;

h) a pump in said return pipe to cause said fluid to continually flow from said second storage tank through said return pipe into said first storage tank;

i) in line educator means in said return pipe on the intake side of said pump for monitoring fluid pressure in said return pipe;

j) a feedback pipe between said educator means and the outlet side of said pump for recycling fluid back to said educator means into said return pipe when said educator means determines that the fluid pressure within said pipeline at said educator means is below a predetermined value;

k) a solar power generator for driving said pump; and l) said pipeline, first and second storage tanks, and feedback pipe form a sealed chamber with said fluid contained therein.

2. The micro hydroelectric power system as recited in claim 1, further comprising a plurality of storage tanks positioned in stacked relationship with each other between said first and second storage tanks, and a plurality of connecting pipes connecting adjacent ones of said plurality of storage tanks.

3. The micro hydroelectric power system as recited in claim 2, further comprising a plurality of penstocks, each penstock including a wheel and electrical generator and connected to a respective one of said plurality of connecting pipes, each electrical generator being connected to supply electrical power for recharging said power supply.

* * * * *